(12) United States Patent
Ikeda et al.

(10) Patent No.: US 11,167,889 B2
(45) Date of Patent: Nov. 9, 2021

(54) SQUEEZE BOTTLE

(71) Applicant: Rohto Pharmaceutical Co., Ltd., Osaka (JP)

(72) Inventors: Naohiro Ikeda, Osaka (JP); Hiroyuki Koshiro, Osaka (JP)

(73) Assignee: ROHTO PHARMACEUTICAL CO., LTD., Osaka (JP)

(*) Notice: Subject to any disclaimer, the term of this patent is extended or adjusted under 35 U.S.C. 154(b) by 0 days.

(21) Appl. No.: 16/603,956

(22) PCT Filed: Apr. 13, 2018

(86) PCT No.: PCT/JP2018/015546
§ 371 (c)(1),
(2) Date: Oct. 9, 2019

(87) PCT Pub. No.: WO2018/190422
PCT Pub. Date: Oct. 18, 2018

(65) Prior Publication Data
US 2020/0122898 A1 Apr. 23, 2020

(30) Foreign Application Priority Data

Apr. 13, 2017 (JP) .............................. JP2017-080068

(51) Int. Cl.
*B65D 35/08* (2006.01)
*B65D 47/20* (2006.01)
(Continued)

(52) U.S. Cl.
CPC ............ *B65D 35/08* (2013.01); *B65D 1/0207* (2013.01); *B65D 47/20* (2013.01); *A61J 1/05* (2013.01);
(Continued)

(58) Field of Classification Search
CPC ...... B65D 35/08; B65D 1/0207; B65D 47/20; B65D 1/095; A61J 1/05; A61J 1/1468; A61J 1/067; A61J 1/1412
See application file for complete search history.

(56) References Cited

U.S. PATENT DOCUMENTS 3,187,966 A * 6/1965 Mindaugas ............ B65D 35/08
222/541.2
3,727,803 A * 4/1973 Cobb .................... B65D 1/0292
222/215
(Continued)

FOREIGN PATENT DOCUMENTS

CN 1777406 A 5/2006
EP 1616549 A1 1/2006
(Continued)

OTHER PUBLICATIONS

International Search Report issued in corresponding International Patent Application No. PCT/JP2018/015546 dated Jun. 12, 2018.
(Continued)

*Primary Examiner* — Frederick C Nicolas
(74) *Attorney, Agent, or Firm* — Morgan, Lewis & Bockius LLP

(57) ABSTRACT

The present invention relates to a squeeze bottle integrally including a container body including a housing portion for housing a liquid composition and a spout connected to the housing portion; and a lid joined to the container body so as to seal an opening of the spout, in which the container body contains a resin containing cyclic olefins and polyethylenes.

8 Claims, 5 Drawing Sheets

(a)

(b)

(51) Int. Cl.
  *B65D 1/02* (2006.01)
  *A61J 1/05* (2006.01)
  *A61J 1/14* (2006.01)
  *A61J 1/06* (2006.01)
  *B65D 1/09* (2006.01)

(52) U.S. Cl.
  CPC .............. *A61J 1/067* (2013.01); *A61J 1/1412* (2013.01); *A61J 1/1468* (2015.05); *B65D 1/095* (2013.01)

(56) References Cited

U.S. PATENT DOCUMENTS

| | | | | |
|---|---|---|---|---|
| 3,993,223 | A | * | 11/1976 | Welker, III ............ B65D 1/095 222/107 |
| 5,048,727 | A | * | 9/1991 | Vlasich .................. B05B 11/00 222/209 |
| 5,361,947 | A | * | 11/1994 | Lifshey .................. B65D 47/10 222/212 |
| 6,343,717 | B1 | * | 2/2002 | Zhang ..................... A61J 1/065 222/209 |
| 6,666,359 | B2 | * | 12/2003 | Lau ......................... A61J 1/067 222/541.5 |
| 6,838,523 | B2 | | 1/2005 | Williams et al. |
| 8,377,029 | B2 | * | 2/2013 | Nagao ..................... A61J 1/067 604/403 |
| 2012/0067926 | A1 | | 3/2012 | Ishikawa et al. |

FOREIGN PATENT DOCUMENTS

| | | | |
|---|---|---|---|
| JP | H05-293159 | A | 11/1993 |
| JP | H07-257538 | A | 10/1995 |
| JP | 2001-157704 | A | 6/2001 |
| JP | 2012111544 | A * | 6/2012 |
| JP | 2012-135621 | A | 7/2012 |
| WO | 2004/093775 | A1 | 11/2004 |
| WO | 2009/113117 | A1 | 9/2009 |

OTHER PUBLICATIONS

International Preliminary Report on Patentability and Written Opinion issued in corresponding International Patent Application No. PCT/JP2018/015546 dated Oct. 24, 2019.
Extended European Search Report issued in counterpart European Patent Application No. 18785062.3 dated Nov. 30, 2020.

* cited by examiner

SQUEEZE BOTTLE

TECHNICAL FIELD

The present invention relates to a squeeze bottle.

BACKGROUND ART

As a container for housing an aqueous pharmaceutical preparation, for example, Patent Literature 1 discloses a plastic ampule integrally formed by a blow fill seal (BFS) method of continuously performing molding of a container, filling the container with an aqueous pharmaceutical preparation, and sealing the container.

CITATION LIST

Patent Literature

Patent Literature 1: International Publication No. 2004/093775

SUMMARY OF INVENTION

Technical Problem

On the other hand, in a squeeze bottle for housing a liquid composition for ophthalmology or the like containing a drug, when the liquid composition is dropped or poured out, there is a demand for excellent operability that one can easily make a droplet, can surely apply the liquid composition to a local site such as an eye or a contact lens and can stably control the dropped amount or the poured amount.

An object of the present invention is to provide a squeeze bottle for housing a liquid composition, which is an integrally formed squeeze bottle and has excellent operability when dripping or pouring.

Solution to Problem

The inventors of the present invention have found that a squeeze bottle integrally formed with a resin containing cyclic olefins and polyethylenes is surprisingly excellent in operability when dripping or pouring.

The present invention is based on this finding and provides the following inventions.

[1] A squeeze bottle integrally comprising:
a container body including a housing portion for housing a liquid composition and a spout connected to the housing portion; and
a lid joined to the container body so as to seal an opening of the spout,
wherein the container body contains a resin containing cyclic olefins and polyethylenes.
[2] The squeeze bottle according to [1], wherein an area of the opening of the spout is 0.15 to 20.0 mm$^2$.
[3] The squeeze bottle according to [1] or [2], wherein a compressive strength on a side surface of the housing portion is 20 to 250 N/mm.
[4] The squeeze bottle according to any one of [1] to [3], wherein a maximum value of light transmittance in a visible light region of a wavelength of 400 to 700 nm of the container body is 50% or more.
[5] The squeeze bottle according to any one of [1] to [4], wherein the container body includes two or more layers of an inner layer and an outer layer, and the inner layer in contact with the liquid composition contains a resin containing cyclic olefins and polyethylenes.
[6] The squeeze bottle according to any one of [1] to [5], wherein the polyethylenes are low-density polyethylene and/or linear low-density polyethylene.
[7] The squeeze bottle according to any one of [1] to [6], wherein a total content of the cyclic olefins in a resin layer containing the cyclic olefins and the polyethylenes in contact with the liquid composition is 50% to 99% by mass based on a total amount of the resin containing the cyclic olefins and the polyethylenes.
[8] The squeeze bottle according to any one of [1] to [7], wherein the liquid composition is an ophthalmic composition.
[9] A method of producing a squeeze bottle, including integrally molding with a resin containing cyclic olefins and polyethylenes.
[10] A method of improving operability of discharging a liquid composition contained in a squeeze bottle, including producing a squeeze bottle by integrally molding with a resin containing cyclic olefins and polyethylenes.

Advantageous Effects of Invention

According to the present invention, it is possible to provide a squeeze bottle for housing a liquid composition, which is an integrally formed squeeze bottle and has excellent operability when dripping or pouring.

DESCRIPTION OF EMBODIMENTS

Hereinafter, embodiments for carrying out the present invention will be described in detail. However, the present invention is not limited to the following embodiments.

Figure 1:
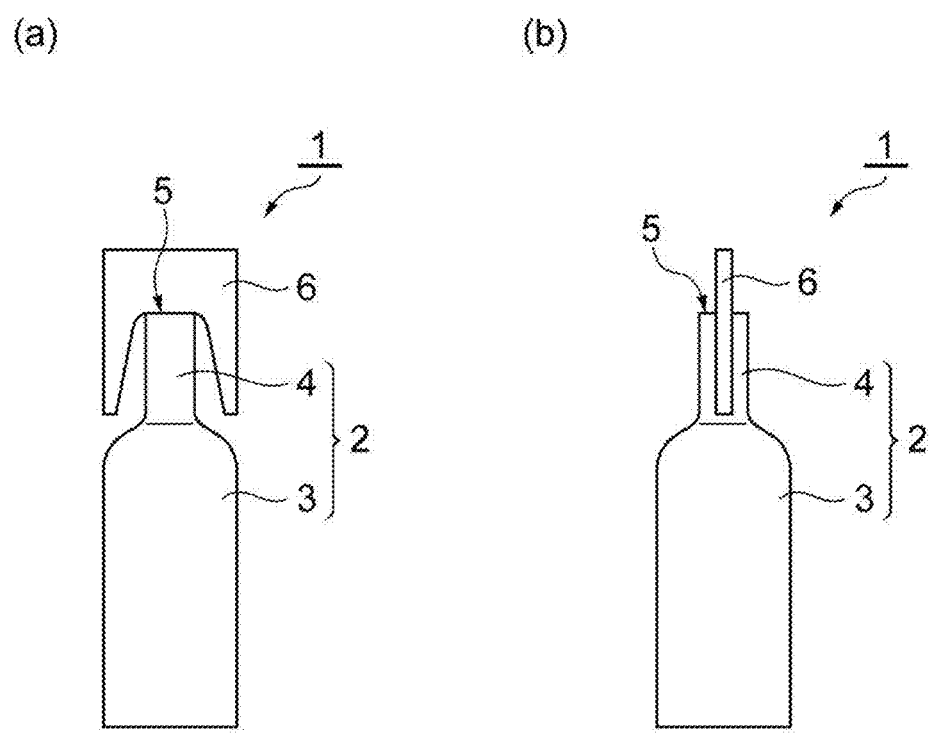
FIG. 1(a) is a front view illustrating a configuration of a squeeze bottle according to an embodiment of the present invention.
FIG. 1(b) is a left side view illustrating a configuration of a squeeze bottle according to the embodiment of the present invention.

FIG. 1(a) is a front view illustrating a configuration of a squeeze bottle according to an embodiment of the present invention, and FIG. 1(b) is a left side view illustrating a configuration of a squeeze bottle according to the embodiment of the present invention. As illustrated in FIGS. 1(a) and 1(b), a squeeze bottle 1 is integrally provided with a container body 2 including a housing portion 3 for housing a liquid composition and a spout 4 connected to the housing portion 3, and a lid 6 joined to the container body 2 so as to seal an opening 5 of the spout 4. Note that, the squeeze bottle according to the present embodiment may be further integrally provided with a thin-walled portion that connects the opening 5 of the spout 4 and the lid 6 to each other. In the above configuration, the opening 5 of the spout 4 is opened by gripping the housing portion 3 and the lid 6 and twisting and tearing them in opposite directions.

Figure 2:
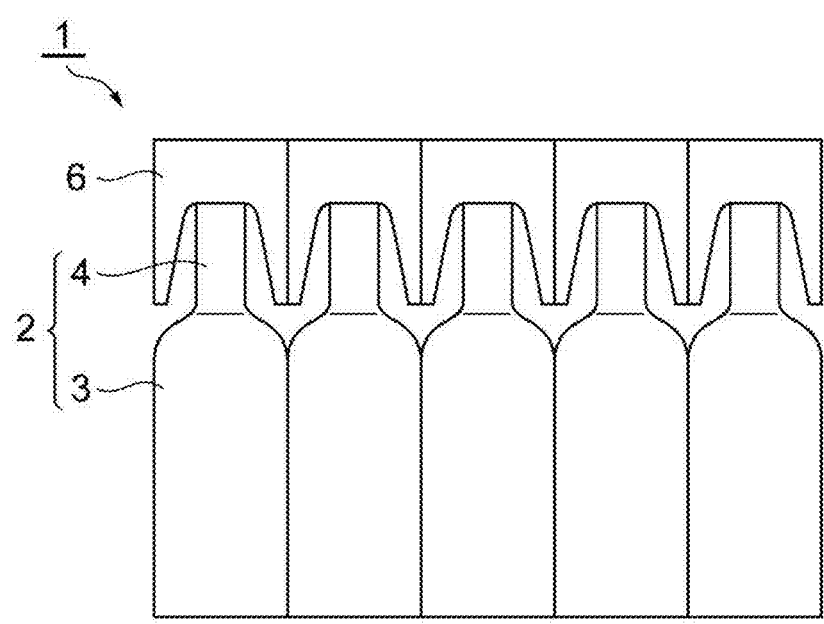
FIG. 2 is a front view illustrating a configuration in which a plurality of squeeze bottles according to the embodiment of the present invention are connected to each other.

FIG. 2 is a front view illustrating a configuration in which a plurality of squeeze bottles according to the embodiment of the present invention are connected to each other. As illustrated in FIG. 2, it is possible to mold two or more (five in FIG. 2) squeeze bottles 1 in a state of being connected to each other. In this case, the side surface of the housing portion 3 and/or the side surface of the lid 6 of the squeeze bottle 1 are molded in a state of being partially connected to the side surface of the housing portion 3 and/or the side surface of the lid 6 of another adjacent squeeze bottle 1, and one squeeze bottle can be separated from the plurality of connected squeeze bottles.

The squeeze bottle according to the present embodiment is a discharge container that discharges the housed liquid composition. The liquid composition is dropped or poured out to be discharged out of the squeeze bottle.

The container body of the squeeze bottle according to the present embodiment includes a resin containing cyclic olefins and polyethylenes (also simply referred to as a "cyclic olefins and polyethylenes containing resin").

Examples of the cyclic olefins include a cyclic olefin polymer (also simply referred to as "COP") and a cyclic olefin copolymer (also simply referred to as "COC"). The cyclic olefins are preferably COC from the viewpoint of more remarkably achieving the effects of the present invention.

The COP is not particularly limited as long as it contains a polymer obtained by copolymerizing one kind of cyclic olefin, a polymer obtained by copolymerizing two or more kinds of cyclic olefins, or a hydrogenated product thereof. The COP preferably contains a ring-opening polymer of cyclic olefin or a hydrogenated product thereof. Further, the COP preferably contains an amorphous polymer.

The COC is not particularly limited as long as it contains a polymer obtained by copolymerizing cyclic olefin and acyclic olefin, or a hydrogenated product thereof.

Examples of the cyclic olefin include monocyclic or polycyclic cycloalkane having a vinyl group, monocyclic or polycyclic cycloalkene, and derivatives thereof. Preferable cyclic olefins are norbornene, tetracyclododecene, and derivatives thereof. Examples of the acyclic olefin include α-olefin such as ethylene, propylene, 1-butene, 1-pentene, and 1-hexene.

As the COP, those containing a polymer of a cyclic olefin having a norbornene skeleton or a hydrogenated product thereof are preferable from the viewpoint of more remarkably achieving the effects of the present invention. As the COC, those containing a polymer obtained by copolymerizing norbornene and ethylene are preferable from the viewpoint of more remarkably achieving the effects of the present invention. In addition, the polymer obtained by copolymerizing cyclic olefin and acyclic olefin may contain other monomers as constituent components of the aforementioned polymer.

The glass transition temperature of the cyclic olefins may be, for example, 60° C. to 200° C., 60° C. to 180° C., 60° C. to 160° C., 60° C. to 150° C., 60° C. to 140° C., 65° C. to 130° C., 65° C. to 120° C., 65° C. to 110° C., 65° C. to 100° C., or 65° C. to 90° C. The glass transition temperature can be measured by a method based on ISO11375.

As the cyclic olefins, commercially available products can be used without particular limitation. Examples of commercially available COPs include ZEONEX (registered trademark) (produced by ZEON Corporation) and ZEONOR (registered trademark) (produced by ZEON Corporation). Examples of commercially available COCs include TOPAS (registered trademark) (produced by Polyplastics Co., Ltd.) and APEL (registered trademark) (produced by Mitsui Chemicals, Inc.).

Examples of polyethylenes (PE) include high density polyethylene (HDPE), medium density polyethylene (MDPE), low-density polyethylene (LDPE), and linear low-density polyethylene (LLDPE). The polyethylenes are preferably LDPE and LLDPE, and more preferably LLDPE, from the viewpoint of more remarkably achieving the effects of the present invention.

The polyethylenes may be a homopolymer or a copolymer. Examples of the comonomer include α-olefins such as 1-butene, 1-pentene, 1-hexene, 1-octene, and 1-decene.

The density of polyethylenes may be, for example, 0.900 to 0.980 kg/m$^3$, 0.900 to 0.942 kg/m$^3$, 0.902 to 0.940 kg/m$^3$, 0.902 to 0.930 kg/m$^3$, 0.905 to 0.927 kg/m$^3$, or 0.908 to 0.920 kg/m$^3$.

As the polyethylenes, a commercially available product can be used without particular limitation. Examples of the commercially available polyethylenes include NOVATEC (registered trademark) (produced by Nippon Polyethylene Corporation), ULTZEX (registered trademark) (produced by Mitsui Chemicals, Inc.), EVOLVE (registered trademark) (produced by Prime Polymer Co., Ltd.), UBE polyethylene (registered trademark) B128H (produced by Ube-Maruzen Polyethlene Co., Ltd.), UMERIT (registered trademark) (produced by Prime Polymer Co., Ltd.), PETROCENE (registered trademark) (produced by Tosoh Corporation), NIPOLON (registered trademark) (Tosoh Corporation), LUMITAC (registered trademark) (produced by Tosoh Corporation), SUNTEC (registered trademark) (produced by Asahi Kasei Chemicals Corporation), and PURELL PE (registered trademark) (produced by LyondellBasell).

The cyclic olefins and polyethylenes containing resin according to the present embodiment may include other polymers such as polypropylene (PP), polycarbonate, a (meth)acrylic acid polymer, polystyrene (PS), polyethylene naphthalate (PEN), polyethylene terephthalate (PET), and polyarylate. In addition, the cyclic olefins and polyethylenes containing resin according to the present embodiment may include an additive such as a stabilizer, a modifier, a colorant, an ultraviolet absorber, a metal oxide, an oxygen absorber, an antibacterial agent, a plasticizer, and a glass fiber. In addition, in a case where the container body of the squeeze bottle includes two or more layers of an inner layer and an outer layer, these additives may be contained in the outer layer.

The container body of the squeeze bottle according to the present embodiment may have a single-layer structure containing the cyclic olefins and polyethylenes containing resin, or may have a multi-layer structure including a layer containing the cyclic olefins and polyethylenes containing resin. In a case where the container body of the squeeze bottle has the multi-layer structure, that is, two or more layers of an inner layer and an outer layer, the layer containing the cyclic olefins and polyethylenes containing resin may be the inner layer in contact with the liquid composition, or may be the outer layer (or intermediate layer) not in contact with the liquid composition, and from the viewpoint of more remarkably achieving the effects of the present invention, it is preferably the inner layer. In addition, in a case where the container body of the squeeze bottle has a multi-layer structure, and the layer containing the cyclic olefins and polyethylenes containing resin is the inner layer in contact with the liquid composition, the kind of resin forming the outer layer (or intermediate layer) is not particularly limited, and for example, one or more polymers selected from the group consisting of polyethylenes (PE), polypropylene (PP), polyethylene terephthalate (PET), polystyrene (PS), acrylonitrile butadiene styrene (ABS), polycarbonate, polymethyl methacrylate, an ethylene vinyl acetate copolymer, and an ethylene vinyl alcohol copolymer may be contained as a constituent component. The resin forming the outer layer (or intermediate layer) is preferably polyethylenes (PE), polypropylene (PP), and an ethylene vinyl alcohol copolymer, more preferably LDPE, LLDPE, PP, and still more preferably LDPE from the viewpoint of more remarkably achieving the effects of the present invention.

In a case where the container body of the squeeze bottle according to the present embodiment has the single-layer structure containing the cyclic olefins and polyethylenes containing resin, or in a case where it is the multi-layer structure including the layer containing the cyclic olefins and polyethylenes containing resin, and the layer containing the cyclic olefins and polyethylenes containing resin is the inner layer in contact with the liquid composition, the content of cyclic olefins in the layer (single layer or inner layer in contact with the liquid composition) containing the resin containing the cyclic olefins and the polyethylenes which is in contact with the liquid composition is not particularly limited, and is appropriately set according to the kind of cyclic olefins, the kind and content of other compounding components, and the like. As the content of the cyclic olefins in the resin layer (single layer or inner layer in contact with the liquid composition) containing the cyclic olefins and the polyethylenes in contact with the liquid composition, from the viewpoint of more remarkably achieving the effects of the present invention, for example, the total content of the cyclic olefins may be 10% to 99% by mass, 30% to 99% by mass, 50% to 99% by mass, 55% to 99% by mass, 60% to 99% by mass, 65% to 99% by mass, 70% to 99% by mass, 75% to 96% by mass, 80% to 96% by mass, 85% to 96% by mass, or 90% to 96% by mass, based on the total amount of the cyclic olefins and polyethylenes containing resin.

In a case where the container body of the squeeze bottle according to the present embodiment has the single-layer structure containing the cyclic olefins and polyethylenes containing resin, or in a case where it is the multi-layer structure including the layer containing the cyclic olefins and polyethylenes containing resin, and the layer containing the cyclic olefins and polyethylenes containing resin is the inner layer in contact with the liquid composition, the content of polyethylenes in the resin layer (single layer or inner layer in contact with the liquid composition) containing the cyclic olefins and the polyethylenes which is in contact with the liquid composition is not particularly limited, and is appropriately set according to the kind of polyethylenes, the kind and content of other compounding components, and the like. As the content of the polyethylenes in the resin layer (single layer or inner layer in contact with the liquid composition) containing the cyclic olefins and the polyethylenes in contact with the liquid composition, from the viewpoint of more remarkably achieving the effects of the present invention, for example, the total content of the polyethylenes may be 1% to 50% by mass, 5% to 50% by mass, 10% to 50% by mass, 15% to 50% by mass, 20% to 50% by mass, 25% to 45% by mass, 30% to 45% by mass, 35% to 45% by mass, or 40% to 45% by mass, based on the total amount of the cyclic olefins and polyethylenes containing resin.

The content of polyethylenes in the container body of the squeeze bottle according to the present embodiment is not particularly limited, and is appropriately set according to the type of polyethylenes, the type and content of other compounding components, and the like. As the content of the polyethylenes in the container body, from the viewpoint of more remarkably achieving the effects of the present invention, the total content of the polyethylenes is, for example, 10% to 95% by mass, 30% to 95% by mass, 35% to 90% by mass, 40% to 85% by mass, 40% to 83% by mass, 40% to 80% by mass, 45% to 78% by mass, 45% to 75% by mass, 45% to 70% by mass, 50% to 65% by mass or 50% to 60% by mass, based on the mass of the container body.

In a case where the container body of the squeeze bottle according to the present embodiment has the single-layer structure containing the cyclic olefins and polyethylenes containing resin, or in a case where it is the multi-layer structure including the layer containing the cyclic olefins and polyethylenes containing resin, and the layer containing the cyclic olefins and polyethylenes containing resin is the inner layer in contact with the liquid composition, the compounding ratio of the polyethylenes to the cyclic olefins in the resin layer (single layer or inner layer in contact with the liquid composition) containing the cyclic olefins and the polyethylenes which is in contact with the liquid composition is not particularly limited, and is appropriately set according to the kind of cyclic olefins and the polyethylenes, the kind and content of other compounding components, and the like. As the compounding ratio of the polyethylenes to the cyclic olefins in the resin layer (single layer or inner layer in contact with the liquid composition) containing the cyclic olefins and the polyethylenes in contact with the liquid composition, from the viewpoint of more remarkably achieving the effects of the present invention, for example, the total content of the polyethylenes with respect to 1 part by mass of total content of the cyclic olefins may be 0.01 to 9.0 parts by mass, 0.01 to 2.5 parts by mass, 0.01 to 1.0 parts by mass, and 0.01 to 0.81 parts by mass, 0.02 to 0.66 parts by mass, 0.02 to 0.53 parts by mass, 0.02 to 0.42 parts by mass, 0.05 to 0.33 parts by mass, 0.05 to 0.25 parts by mass, 0.05 to 0.17 parts by mass, or 0.05 to 0.11 parts by mass.

The resin for molding the lid of the squeeze bottle according to the present embodiment is not particularly limited, and from the viewpoint that the container body and the lid can be integrally molded by a blow fill seal (BFS) method, the same resin as the container body is preferable.

The area of the opening of the spout of the squeeze bottle according to the present embodiment may be, for example, 0.15 to 20.0 $mm^2$, 0.2 to 20.0 $mm^2$, 0.2 to 18.0 $mm^2$, 0.2 to 16.0 $mm^2$, 0.2 to 14.0 $mm^2$, 0.2 to 12.6 $mm^2$, 0.2 to 11.0 $mm^2$, 0.2 to 9.7 $mm^2$, 0.5 to 8.0 $mm^2$, 0.79 to 7.1 $mm^2$, 0.79 to 6.2 $mm^2$, or 0.79 to 5.0 $mm^2$, from the viewpoint of more remarkably achieving the effects of the present invention. The area of the opening of the spout can be calculated by measuring a diameter of the opening or a major axis and a minor axis of the opening using a caliper, a micrometer, a profile projector, a stereomicroscope, or the like. In addition, as long as the effect by the present invention is achieved, the shape of the opening of the spout can be suitably designed. From the viewpoint of more remarkably exhibiting the effect of the present invention, a circle or an ellipse is preferable.

The compressive strength at the side surface of the housing portion of the squeeze bottle according to the present embodiment may be, for example, 20 to 250 N/mm, 20 to 240 N/mm, 20 to 230 N/mm, 20 to 220 N/mm, 20 to 210 N/mm, 20 to 200 N/mm, 20 to 190 N/mm, 20 to 180 N/mm, 20 to 170 N/mm, 20 to 160 N/mm, 20 to 150 N/mm, 20 to 140 N/mm, 20 to 130 N/mm, 20 to 120 N/mm, 20 to 110 N/mm, 20 to 100 N/mm, 20 to 90 N/mm, 20 to 85 N/mm, 20 to 80 N/mm, 20 to 75 N/mm, 20 to 70 N/mm, 20 to 65 N/mm, 20 to 60 N/mm, or 20 to 55 N/mm, from the viewpoint of more remarkably achieving the effects of the present invention. Here, the "side surface of the housing portion" includes a portion that is normally gripped with a finger when the liquid composition is dropped or poured out. In addition, in a case where a shape of a cross section (the cross section along the direction perpendicular to the direction in which the liquid composition is dropped or poured out) of the housing portion of the squeeze bottle according to the present embodiment is a circle or an ellipse, the "side surface of the housing portion" means "circumferential surface of the housing portion".

Figure 3:
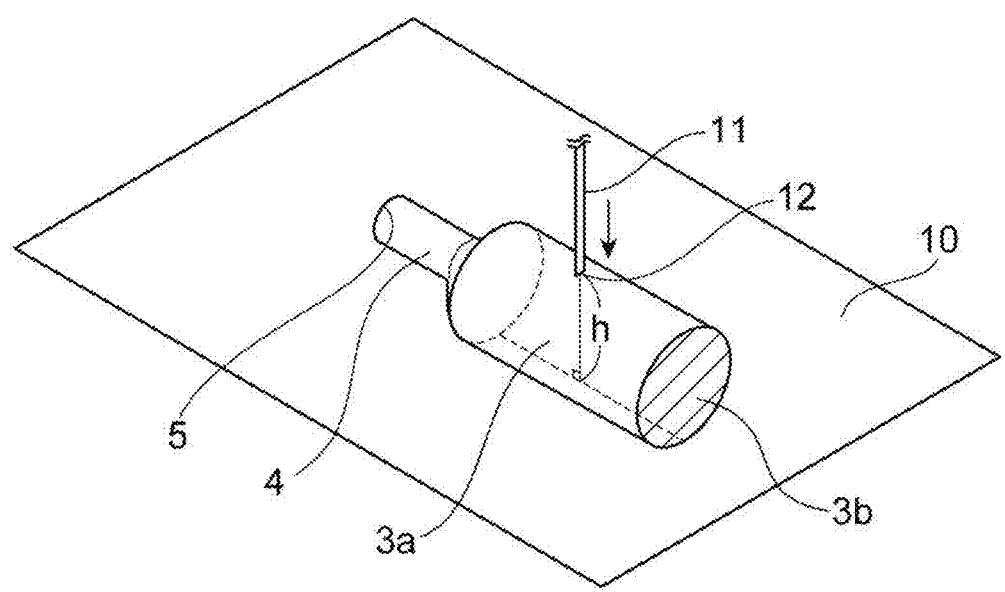
FIG. 3 is a perspective view illustrating a method of measuring a maximum test force.

The compressive strength on the side surface of the housing portion can be determined as follows using, for example, a precision universal testing machine (AUTOGRAPH AGS-X, produced by Shimadzu Corporation). FIG. 3 is a perspective view illustrating a method of measuring the maximum test force in a case where the shape of the cross section of the housing portion (a cross section along a direction perpendicular to a direction in which a liquid composition is dropped or poured out) is a circle or an ellipse. Note that, in FIG. 3, a dotted line drawn in the height direction of the container body on a side surface (circumferential surface) 3a of the housing portion indicates a part where the side surface (circumferential surface) 3a of the housing portion and a plane 10 are in contact with each other.

1) The opening 5 of the spout 4 is opened and the squeeze bottle 1 that does not contain the liquid composition is placed on the plane 10 (for example, the measurement stage of a precision universal testing machine) so that the opening 5 faces sideways.

2) On the side surface (circumferential surface) 3a of the housing portion, a measuring probe 11 is brought into contact with a site 12 (one place; hereinafter, also referred to as "maximum test force measurement site") which is usually held by a fingertip for dropping or pouring the liquid composition, and the maximum value (hereinafter, referred to as "maximum test force") of the force required to push half distance (h/2) of distance h between the maximum test force measurement site 12 and the plane 10 at a speed of 100 mm/min is measured. Note that, as a shape of the measuring probe 11, a shape that all of its end surfaces are in contact with the maximum test force measurement site 12 on the side surface (circumferential surface) 3a of the housing portion and does not penetrate the side surface (circumferential surface) 3a of the housing portion is selected as appropriate. Further, a bottom surface 3b of the housing portion is not a site for measuring the maximum test force.

3) A value obtained by dividing the measured maximum test force by the thickness of the maximum test force measurement site (hereinafter, also referred to as "maximum test force per unit thickness") is calculated according to the following Expression 1.

Maximum test force per unit thickness (N/mm)= Maximum test force/Thickness of site where maximum test force was measured on side surface (circumferential surface) of the housing portion [Expression 1]

4) For five squeeze bottles 1 having the same composition and shape, the maximum test force per unit thickness at the same site is calculated, and then an average value of the obtained five values (hereinafter, referred to as "average value of maximum test force per unit thickness") is calculated.

5) For a plurality of (three or more) the maximum test force measurement sites 12 on the side surface (circumferential surface) 3a of the housing portion of the squeeze bottle 1, the average value of the maximum test force per unit thickness was calculated, and the minimum value in the three or more obtained average values of the maximum test force per unit thickness is referred to as "compressive strength on the side surface (circumferential surface) of the housing portion".

The shape of the cross section (the cross section along the direction perpendicular to a direction in which the liquid composition is dropped or poured out) of the housing portion of the squeeze bottle according to the present embodiment can be designed as appropriate. From the viewpoint of more remarkably achieving the effects of the present invention, a circle, an ellipse, a rectangle, or a polygon is preferable, and the ellipse or the rectangle is more preferable.

The dropping amount per drop dropped from the spout of the squeeze bottle according to the present embodiment can be designed to be 1 to 130 µL, is preferably 1 to 99 µL, more preferably 1 to 79 µL, still more preferably 7 to 79 µL, and even more preferably 13 to 79 µL, from the viewpoint of more remarkably achieving the effects of the present invention. The dropping amount per drop can be adjusted by setting the area of the opening of the spout and the compressive strength on the circumferential surface of the housing portion within the above-mentioned range.

The volume of the squeeze bottle according to the present embodiment is not particularly limited, and may be suitably set according to a use. Further, the squeeze bottle may be a container that houses the liquid composition for use a large number of times (for example, 25 times or more), may be a container that houses the liquid composition for use a small number of times (for example, twice or more and less than 25 times), and may be a container that houses the liquid composition for a single use. The squeeze bottle according to the present embodiment is preferably a container that houses the liquid composition for use a small number of times or a single use.

In a case where the squeeze bottle according to the present embodiment is a container for housing eye drops, a contact lens wearing solution, eye wash, or nasal drops, the volume may be 0.01 mL or more and 50 mL or less, 0.05 mL or more and 40 mL or less, 0.1 mL or more and 25 mL or less. In a case where the squeeze bottle is a container for housing eye drops, a contact lens wearing solution, eye wash, nasal drops, a hair restorer, or a hair grower, and is for use a small number of times (for example, twice or more and less than 25 times) or a single use, the volume may be 0.01 mL or more and 7 mL or less, 0.05 mL or more and 6 mL or less, 0.1 mL or more and 5 mL or less, 0.1 mL or more and 4 mL or less, 0.1 mL or more and 3 mL or less, 0.1 mL or more and 2.5 mL or less, 0.2 mL or more and 2 mL, 0.2 mL or more and 1.5 mL or less, and 0.2 mL or more and 1 mL or less.

The container body of the squeeze bottle according to the present embodiment preferably has transparency from the viewpoint that the confirmation of the foreign matter, the confirmation of the remaining amount, or the like can be observed with naked eyes. The container body of the squeeze bottle may be colorless or colored as long as it has transparency. The container body of the squeeze bottle only needs to have transparency with sufficient internal visibility so that the inside can be observed with the naked eyes, and it is not always necessary for the entire surface of the container body to have uniform transparency as long as the above-mentioned internal visibility is ensured in a part of the container body. As for transparency, for example, the maximum value of light transmittance in the visible light region of a squeeze bottle having a wavelength of 400 to 700 nm (hereinafter, also referred to as "maximum light transmittance") may be 50% or more, 55% or more, 60% or more, 65% or more, 70% or more, 75% or more, 80% or more, 85% or more, 90% or more, or 95% or more. The maximum light transmittance can be obtained from each light transmittance obtained by measuring the light transmittance every 10 nm between wavelengths of 400 to 700 nm using a microplate reader or the like.

The thickness of the container body of the squeeze bottle according to the present embodiment may be, for example, 0.01 or more and 2.0 mm or less, 0.05 or more and 1.8 mm or less, 0.08 or more and 1.5 mm or less, 0.08 or more and 1.2 mm or less, 0.08 or more and 1.0 mm, 0.08 or more and 0.8 mm or less, 0.1 or more and 0.6 mm or less, 0.1 or more and 0.5 mm or less, or 0.1 or more and 0.4 mm or less, from the viewpoint of more remarkably achieving the effects of the present invention. In a case where the container body of the squeeze bottle according to the present embodiment includes of two or more layers, the thickness of the layer containing the cyclic olefins and polyethylenes containing resin may be, for example, 0.01 or more and 1.0 mm or less, 0.05 or more and 0.8 mm or less, 0.08 or more and 0.6 mm or less, 0.08 or more and 0.5 mm or less, 0.08 or more and 0.4 mm or less, 0.08 or more and 0.3 mm or less, or 0.1 or more and 0.2 mm or less.

The liquid composition housed in the squeeze bottle according to the present embodiment only needs to have fluidity such that the housing portion of the container can be filled with liquid composition.

A viscosity of the liquid composition housed in the squeeze bottle according to the present embodiment is not particularly limited as long as it is within a pharmaceutically, pharmacologically (pharmaceutical) or physiologically acceptable range. As the viscosity of the liquid composition, for example, the viscosity at 20° C. measured with a rotational viscometer (RE550 type viscometer, produced by Told Sangyo Co., Ltd., rotor: 1°34'××R24) may be 0.5 to 1000 mPa·s, 0.8 to 500 mPa·s, 1.0 to 250 mPa·s, 1.0 to 100 mPa·s, 1.0 to 80 mPa·s, 1.0 to 70 mPa·s, 1.0 to 60 mPa·s, 1.0 to 50 mPa·s, 1.0 to 40 mPa·s, 1.0 to 30 mPa·s, 1.0 to 25 mPa·s, 1.0·20 mPa·s, 1.0 to 15 mPa·s, 1.0 to 10 mPa·s, 1.0 to 8.0 mPa·s, 1.0 to 7.0 mPa·s, 1.0 to 6.0 mPa·s, 1.0 to 5.0 mPa·s, 1.0 to 4.0 mPa·s, 1.0 to 3.0 mPa·s, or 1.0 to 2.0 mPa·s.

The liquid composition housed in the squeeze bottle according to the present embodiment may be an aqueous composition or an oily composition, and is preferably an aqueous composition. Further, specific examples of the liquid composition housed in the squeeze bottle according to the present embodiment include an external liquid composition such as an ophthalmic composition, an otolaryngological composition, and a skin composition; a liquid composition for internal use, and the ophthalmic compositions is preferable.

In a case where the liquid composition housed in the squeeze bottle according to the present embodiment is the aqueous composition, from the viewpoint of more remarkably achieving the effects of the present invention, the content of water may be, for example, 15 w/v % or more and less than 100 w/v %, 20 w/v % or more and less than 100 w/v %, 25 w/v % or more and less than 99.5 w/v %, 30 w/v % or more and less than 99.5 w/v %, 40 w/v % or more and less than 99.2 w/v %, 50 w/v % or more and less than 99.2 w/v %, 60 w/v % or more and less than 99.2 w/v %, 70 w/v % or more and less than 99 w/v %, 80 w/v % or more and less than 99 w/v %, 85 w/v % or more and less than 99 w/v %, or 90 w/v % or more and less than 98.5 w/v %, based on the total amount of the liquid composition.

In a case where the liquid composition housed in the squeeze bottle according to the present embodiment is the ophthalmic composition, the kind of the squeeze bottle may be, specifically, an eye drop container, an eye wash housing container, and a contact lens wearing solution housing container, or a liquid housing container for contact lens care solution (including a contact lens cleansing solution housing container, a contact lens storage solution housing container, a contact lens disinfecting solution housing container, and a contact lens multipurpose solution housing container). The kind of squeeze bottle is preferably the eye drop container, the eyewash container, the contact lens wearing solution housing container, or the liquid housing container for contact lens care solution. Further, the squeeze bottle according to the present embodiment is excellent in the operability when discharging (dropping or pouring) the house liquid composition, and therefore it is possible to discharges the liquid composition as intended by a user. In particular, it is suitable as a discharge container for housing the liquid composition used for an eye part, where pain and disability are easily caused by eyelid closure reflex and dryness and has a relatively small application area during using, that is, it is suitable as the eye drop container. The "contact lens" includes a hard contact lens and a soft contact lens (including both an ionic lens and a nonionic lens, and including both a silicone hydrogel contact lens and a non-silicone hydrogel contact lens).

The squeeze bottle according to the present embodiment can be produced, for example, by a blow fill seal (BFS) method described in Patent Literature 1. Specifically, a squeeze bottle including a container body formed of a single layer is produced by extruding a resin containing cyclic olefins and polyethylenes as materials of the squeeze bottle to produce a parison. Next, each part of the container body of the squeeze bottle is molded by sandwiching the obtained parison with a split mold and press-fitting air into the interior or suctioning the parison through a vacuum hole installed in the mold surface (blowing step), and filling the housing portion with the liquid composition (filling step). Next, it can be produced by molding a lid with the split mold and sealing the opening of the spout (sealing step). A squeeze bottle including the container body formed of a multi-layer is produced in the same manner as the production of the squeeze bottle including the container body formed of the single layer, except that a multi-layer structure parison produced according to a conventional method in multi-layer blow molding is used. In addition, a layer configuration of the multi-layer structure parison may be suitably set according to the layer configuration required for the squeeze bottle.

The squeeze bottle according to the present embodiment may be provided as a product (eye drops, eye wash, contact lens-related products, lotion, cosmetic liquid, hair tonic, makeup cosmetics, a scalp care agent, a hair restorer, a hair grower, beverages, or the like) in which the liquid composition is housed in the squeeze bottle.

EXAMPLES

Hereinafter, the present invention will be specifically described based on test examples, but the present invention is not limited thereto.

Test Example 1: Compression Test (1)

A squeeze bottle in each test example, which was integrally provided with a container body including a housing portion and a spout, and a lid, molded with a resin containing cyclic olefins and polyethylenes at a compounding ratio indicated in Tables 1 and 2, and filled with 5 mL of purified water was produced by a blow fill seal method. TOPAS8007 (produced by Polyplastics Co., Ltd.) was used as a cyclic olefin copolymer, low-density polyethylene having a density of 0.927 kg/m³ was used, and linear low-density polyethylene having a density of 0.920 kg/m³ was used. The shape of the housing portion of each produced squeeze bottle was 38 mm in height, 20 mm in major axis (outer diameter), 13 mm in minor axis (outer diameter), and about 500 μm in thickness.

After grasping and twisting the lid of the squeeze bottle of each of the above test examples, separating the lid from the container body, and opening the opening, the purified water with which the squeeze bottle was filled was discharged from the opening to make the housing portion of the squeeze bottle empty. The opening was a circle and the diameter was 1.5 mm (inner diameter).

Using a precision universal testing machine (AUTOGRAPH AGS-X, produced by Shimadzu Corporation), the compressive strength of the side surface (circumferential surface) of the housing portion of each squeeze bottle was measured. The squeeze bottle was placed on a measurement stage of the precision universal testing machine so that the opening 5 was directed sideways. The entire surface of the measuring probe (cylindrical shape with a diameter of 3 mm at the tip; made of stainless steel) was brought into contact with a central part (one place), as a maximum test force measurement site, of the side surface (circumferential surface) of the housing portion, and the maximum test force (N) was measured when half distance (6.5 mm) of the distance (minor axis 13 mm) between the maximum test force measurement site and the measurement stage was pushed at a speed of 100 mm/min. Moreover, the thickness of the maximum test force measurement site of the housing portion side surface (circumferential surface) was measured using calipers. According to the following Expression 1, the maximum test force per unit thickness was calculated. This was performed with five squeeze bottles for one test example, and the average value of the maximum test force per unit thickness was calculated. For three different maximum test force measurement sites in the housing portion of the squeeze bottle, the average value of the maximum test force per unit thickness was calculated, and the minimum value in the three obtained average values of the maximum test force per unit thickness was set as compressive strength on the side surface (circumferential surface) of the housing portion in the test example. The compression test was performed under conditions of room temperature 23° C. and humidity 50%. The results are indicated in Tables 1 and 2.

Maximum test force per unit thickness (N/mm)=
Maximum test force/Thickness of site where maximum test force was measured on side surface (circumferential surface) of the housing portion [Expression 1]

Test Example 2: Operability Evaluation (1)

In the same manner as in Test Example 1, squeeze bottles of the respective test examples indicated in Tables 1 and 2 were produced.

Four subjects grasped and twisted the lid of the squeeze bottle, and opened the opening by separating the lid and the container body. The diameter of the opening was 1.5 mm (inner diameter). Next, the subject dropped a drop of purified water with which the squeeze bottle was filled from 10 cm above a plane on which a circle with a diameter of 24 mm was placed to the center point of the circle as a target. Regarding the operability, the questionnaire was answered by a VAS (Visual Analog Scale) method. The subject attempted to drop the number of drops indicated in the questionnaire. Specifically, regarding the three items of 1) it was possible to drop only one droplet, 2) it was possible to continuously drop two droplets, and 3) it was possible to deposit the droplets to a target point (the center point of a circle with a diameter of 24 mm) at the intended timing, assuming that "most felt" was 10 cm and "not felt at all" was 0 cm on a survey sheet on which a 10 cm straight line was written, the subject was shown the points on the straight line corresponding to each of the above items, and the distance (cm) from the 0 cm point was measured to obtain a VAS value. In addition, the intended timing means that an operation is performed so that droplets are deposited one second after the pressing of the housing portion. The average of the VAS values of the four subjects was taken as the VAS value of the test example. The results are indicated in Tables 1 and 2. In addition, it can be evaluated that the squeeze bottle is excellent in the operability as the value which totaled the VAS value regarding each evaluation item is large.

TABLE 1

| | | TEST EXAMPLE 1-1 | TEST EXAMPLE 1-2 | TEST EXAMPLE 1-3 | TEST EXAMPLE 1-4 | TEST EXAMPLE 1-5 | TEST EXAMPLE 1-6 |
|---|---|---|---|---|---|---|---|
| CYCLIC OLEFIN COPOLYMER | | 100 | 90 | 70 | 55 | 30 | 10 |
| LOW-DENSITY POLYETHYLENE | | — | 10 | 30 | 45 | 70 | 90 |
| TEST EXAMPLE 1: COMPRESSIVE STRENGTH (N/mm) | | 261.2 | 207.7 | 177.9 | 155.6 | 133.3 | 41.0 |
| TEST EXAMPLE 2: VAS VALUE | IT WAS POSSIBLE TO DROP ONLY ONE DROPLET | 2.4 | 6.2 | 7.6 | 6.0 | 5.4 | 3.0 |
| | IT WAS POSSIBLE TO CONTINUOUSLY DROP TWO DROPLETS | 3.0 | 6.8 | 8.0 | 6.6 | 6.0 | 3.4 |
| | IT WAS POSSIBLE TO | 2.6 | 6.4 | 8.0 | 5.8 | 5.8 | 3.0 |

TABLE 1-continued

|  | TEST EXAMPLE 1-1 | TEST EXAMPLE 1-2 | TEST EXAMPLE 1-3 | TEST EXAMPLE 1-4 | TEST EXAMPLE 1-5 | TEST EXAMPLE 1-6 |
|---|---|---|---|---|---|---|
| DEPOSIT DROPLETS TO TARGET POINT AT INTENDED TIMING |  |  |  |  |  |  |
| CONTENT OF POLYETHYLENES WITH RESPECT TO 1 PART BY MASS OF CYCLIC OLEFINS (PART BY MASS) | — | 0.1 | 0.43 | 0.81 | 2.3 | 9.0 |

TABLE 2

|  |  | TEST EXAMPLE 1-7 | TEST EXAMPLE 1-8 | TEST EXAMPLE 1-9 | TEST EXAMPLE 1-10 | TEST EXAMPLE 1-11 |
|---|---|---|---|---|---|---|
| CYCLIC OLEFIN COPOLYMER |  | 90 | 70 | 55 | 30 | 10 |
| LINEAR LOW-DENSITY POLYETHYLENE |  | 10 | 30 | 45 | 70 | 90 |
| TEST EXAMPLE 1: COMPRESSIVE STRENGTH (N/mm) |  | 161.9 | 113.3 | 94.5 | 75.6 | 29.9 |
| TEST EXAMPLE 2: VAS VALUE | IT WAS POSSIBLE TO DROP ONLY ONE DROPLET | 6.8 | 8.6 | 6.8 | 4.8 | 2.6 |
|  | IT WAS POSSIBLE TO CONTINUOUSLY DROP TWO DROPLETS | 7.0 | 8.8 | 6.8 | 5.8 | 3.2 |
|  | IT WAS POSSIBLE TO DEPOSIT DROPLETS TO TARGET POINT AT INTENDED TIMING | 6.8 | 8.4 | 6.0 | 5.4 | 3.0 |
| CONTENT OF POLYETHYLENES WITH RESPECT TO 1 PART BY MASS OF CYCLIC OLEFINS (PART BY MASS) |  | 0.1 | 0.43 | 0.81 | 2.3 | 9.0 |

When comparing the squeeze bottles of Test Examples 1-2 to 1-11 molded with a resin containing the cyclic olefins and the polyethylenes with the squeeze bottles of Test Example 1-1 molded with a resin containing the cyclic olefins but not containing the polyethylenes, it was confirmed that the compressive strength was low, and the operability when dropping was improved. When one (subject A) of the subjects attempted to drop only one droplet in Test Example 1-1, purified water was discharged in a linear shape and did not become a drop shape (VAS value was 0). When the subject A attempted to drop two droplets in succession in Test Example 1-8, the center point of the first deposited droplet overlapped with the target point, and the center point of the second deposited droplet was a point about 2 mm away from the target point (VAS value was 9.2). When another test subject (subject B) attempted to drop only 1 drop in Test Example 1-1, and purified water was deposited outside the target (circle with a diameter of 24 mm) (VAS value was 0). When the subject B attempted to drop two droplets in succession in Test Example 1-7, the center point of both droplets was about 5 mm away from the target point (VAS value was 7.2).

When the same test as Test Examples 1 and 2 was conducted for a two-layer squeeze bottle with a resin containing a cyclic olefin copolymer and low-density polyethylene at a compounding ratio of 90:10 as the inner layer (thickness of 100 μm) and low-density polyethylene as the outer layer (thickness of 400 μm), the compressive strength was 100.2 N/mm, the VAS value for "it was possible to drop only one droplet" was 7.8, the VAS value for "it was possible to continuously drop two droplets" was 7.6, and the VAS value for "it was possible to deposit the droplets to a target point" was 7.6.

When the same test as Test Examples 1 and 2 was conducted for a two-layer squeeze bottle with a resin containing a cyclic olefin copolymer and linear low-density polyethylene at a compounding ratio of 70:30 as an inner layer (thickness of 100 μm) and low-density polyethylene as an outer layer (thickness of 400 μm), the compressive strength was 95.4 N/mm, the VAS value for "it was possible to drop only one droplet" was 8.2, the VAS value for "it was possible to continuously drop two droplets" was 7.8, and the VAS value for "it was possible to deposit the droplets to a target point" was 8.0.

Further, when the maximum value of the light transmittance of the housing portion was measured, all of the light transmittance were 50% or more, for example, it was 85% in Test Example 1-3, 70% in Test Example 1-4, and 57% in Test Example 1-10. The maximum value of the light transmittance is calculated from the light transmittance obtained by measuring the light transmittance every 10 nm between the wavelengths of 400 to 700 nm using a microplate reader (SH-9000, produced by Corona Electric Co., Ltd.).

Test Example 3: Operability Evaluation (2)

A squeeze bottle having different opening areas in each test example, which was integrally provided with a container body including a housing portion and a spout, and a lid, molded with a resin containing cyclic olefins and polyethylenes at a compounding ratio indicated in Tables 3 and 4, and filled with 5 mL of purified water was produced by a blow fill seal method. TOPAS8007 (produced by Polyplastics Co., Ltd.) was used as a cyclic olefin copolymer, low-density polyethylene having a density of 0.927 kg/m³ was used, and linear low-density polyethylene having a density of 0.920 kg/m³ was used. The shape of the housing portion of each squeeze bottle produced was 38 mm in height, and about 500 μm in thickness.

The subject grasped and twisted the lid of the squeeze bottle, and opened the opening by separating the lid and the housing portion. Next, the subject dropped a drop of purified water with which the squeeze bottle was filled from 10 cm above a plane on which a circle with a diameter of 24 mm was placed to the center point of the circle as a target. Regarding the operability, the questionnaire was answered by a VAS (Visual Analog Scale) method. The subject attempted to drop the number of drops indicated in the questionnaire. Specifically, regarding the three items of 1) it was possible to drop only one droplet, 2) it was possible to continuously drop two droplets, and 3) it was possible to deposit the droplets to a target point (the center point of a circle with a diameter of 24 mm) at the intended timing, assuming that "most felt" was 10 cm and "not felt at all" was 0 cm on a survey sheet on which a 10 cm straight line was written, the subject was shown the points on the straight line corresponding to each of the above items, and the distance (cm) from the 0 cm point was measured to obtain a VAS value. In addition, it can be evaluated that the squeeze bottle is excellent in the operability as the value which totaled the VAS value regarding each evaluation item is large. The area of the opening was calculated by measuring the major axis and the minor axis using a profile projector (PROFILE PROJECTOR V-12B, produced by Nikon Corporation).

TABLE 3

|  |  | TEST EXAMPLE 2-1 | TEST EXAMPLE 2-2 | TEST EXAMPLE 2-3 | TEST EXAMPLE 2-4 | TEST EXAMPLE 2-5 | TEST EXAMPLE 2-6 |
|---|---|---|---|---|---|---|---|
| CYCLIC OLEFIN COPOLYMER |  | 70 | 70 | 70 | 70 | 70 | 70 |
| LINEAR LOW-DENSITY POLYETHYLENE |  | 30 | 30 | 30 | 30 | 30 | 30 |
| AREA OF OPENING (mm²) |  | 0.196 | 0.785 | 1.767 | 3.142 | 4.909 | 7.069 |
| VAS VALUE | IT WAS POSSIBLE TO DROP ONLY ONE DROPLET | 1.4 | 5.4 | 8.6 | 7.0 | 52 | 2.6 |
|  | IT WAS POSSIBLE TO CONTINUOUSLY DROP TWO DROPLETS | 1.2 | 4.4 | 8.8 | 6.8 | 4.6 | 2.2 |
|  | IT WAS POSSIBLE TO DEPOSIT DROPLETS TO TARGET POINT AT INTENDED TIMING | 1.8 | 5.0 | 8.4 | 6.8 | 4.6 | 3.2 |

TABLE 4

|  |  | TEST EXAMPLE 2-7 | TEST EXAMPLE 2-8 | TEST EXAMPLE 2-9 | TEST EXAMPLE 2-10 | TEST EXAMPLE 2-11 | TEST EXAMPLE 2-12 | TEST EXAMPLE 2-13 | TEST EXAMPLE 2-14 |
|---|---|---|---|---|---|---|---|---|---|
| CYCLIC OLEFIN COPOLYMER |  | 90 | 70 | 30 | 10 | 90 | 70 | 30 | 10 |
| LOW-DENSITY POLYETHYLENE |  | 10 | 30 | 70 | 90 | — | — | — | — |
| LINEAR LOW-DENSITY POLYETHYLENE |  | — | — | — | — | 10 | 30 | 70 | 90 |
| AREA OF OPENING (mm²) |  | 1.767 | 1.767 | 1.767 | 1.767 | 1.767 | 1.767 | 1.767 | 1.767 |
| VAS VALUE | IT WAS POSSIBLE TO DROP ONLY ONE DROPLET | 6.4 | 7.6 | 5.6 | 3.6 | 6.8 | 8.6 | 4.8 | 3.2 |
|  | IT WAS POSSIBLE TO CONTINUOUSLY DROP TWO DROPLETS | 6.4 | 8.0 | 5.4 | 3.2 | 6.6 | 8.8 | 4.4 | 3.0 |
|  | IT WAS POSSIBLE TO DEPOSIT DROPLETS TO TARGET POINT AT INTENDED TIMING | 6.6 | 8.0 | 5.4 | 3.6 | 7.0 | 8.4 | 4.8 | 3.2 |

Test Example 4: Compression Test (2)

Figure 4:
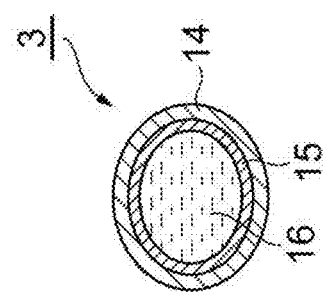
FIG. 4(a) is a front view illustrating a configuration of a squeeze bottle produced in Test Example 4.
FIG. 4(b) is a left side view illustrating a configuration of the squeeze bottle produced in Test Example 4.
FIG. 4(c) is a view schematically illustrating a cross section (a cross section along a direction perpendicular to a direction in which a liquid composition is dropped or poured out) of the housing portion of the squeeze bottle produced in Test Example 4.
Figure 4:
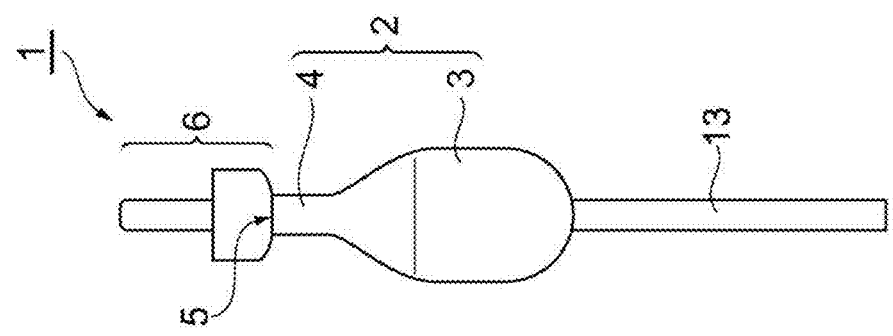
Figure 4:
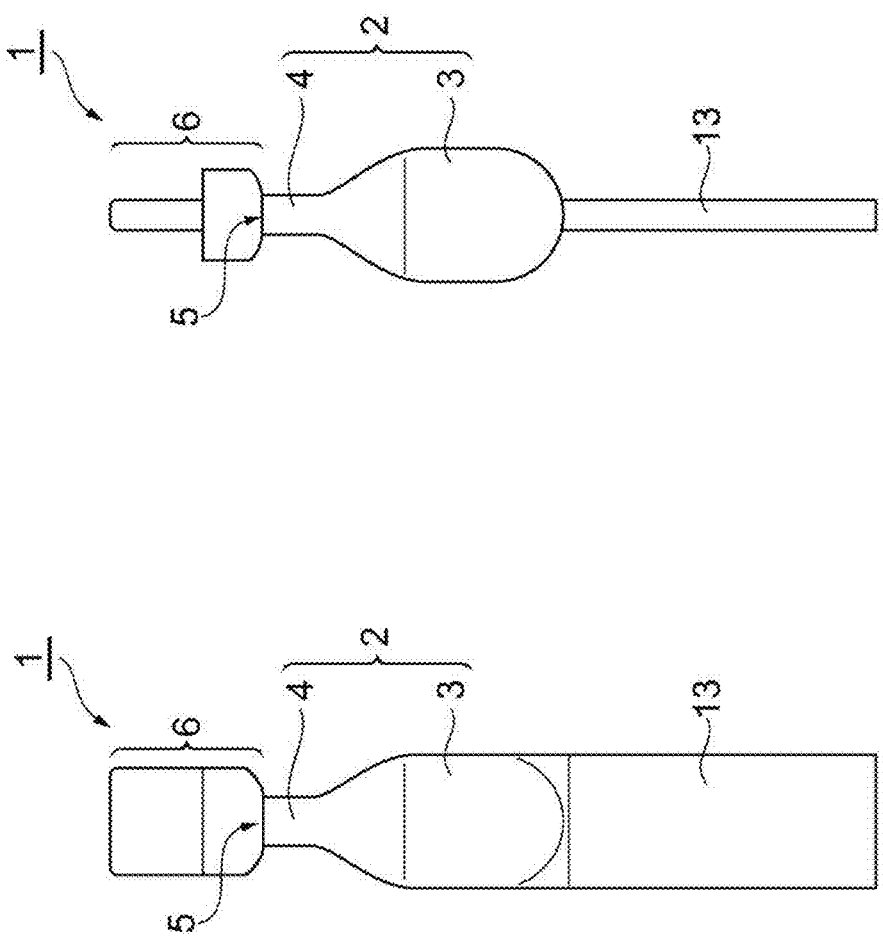
Figure 5:
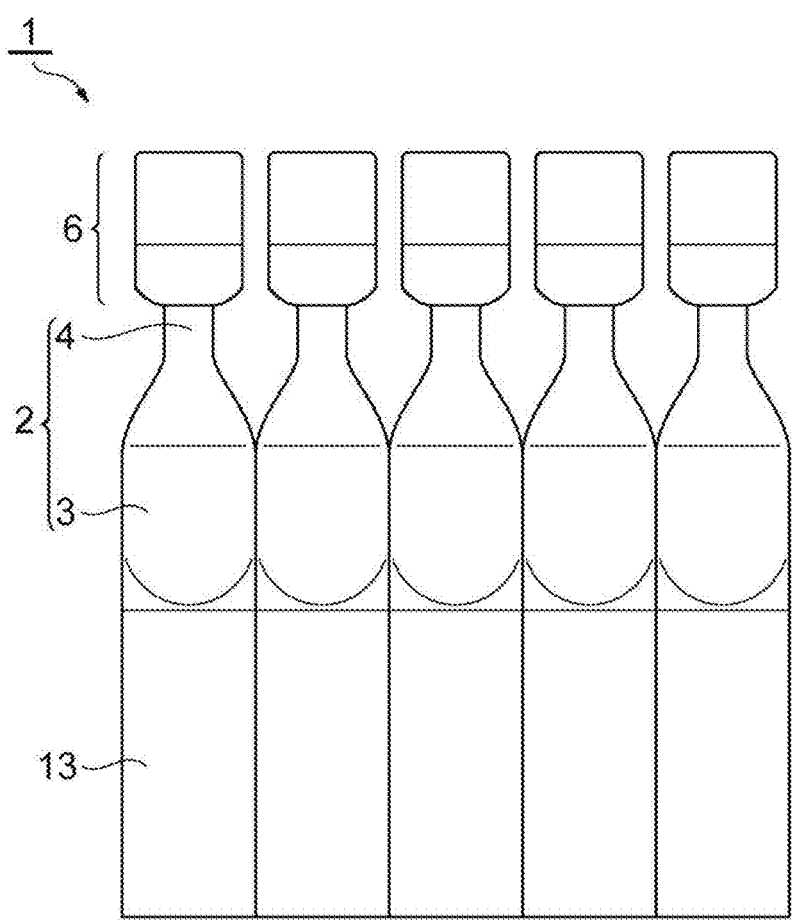
FIG. 5 is a front view illustrating a plurality of connected squeeze bottles produced in Test Example 4.

A two-layer squeeze bottle 1 in each example was produced by a blow fill seal method. The squeeze bottle 1 was integrally provided with a container body including a housing portion and a spout, and a lid, and was filled with 0.5 mL of liquid composition (purified water), in which a resin containing a cyclic olefin copolymer (TOPAS8007 (produced by Polyplastics Co., Ltd.)) and linear low-density polyethylene (density of 0.920 kg/m$^3$) at a compounding ratio indicated in Table 5 as an inner layer and low-density polyethylene (density of 0.927 kg/m$^3$) as an outer layer (FIG. 4). Five squeeze bottles were produced in a connected state (FIG. 5), and one squeeze bottle was separated from the connected squeeze bottles to be used.

FIG. 4(*a*) is a front view illustrating a configuration of a squeeze bottle produced in Test Example 4, and FIG. 4(*b*) is a left side view illustrating a configuration of the squeeze bottle produced in Test Example 4. As illustrated in FIGS. 4(*a*) and 4(*b*), the squeeze bottle 1 is integrally provided with the container body 2 including the housing portion 3 and the spout 4 connected to the housing portion 3, and the lid 6 joined to the container body 2 so as to seal the opening 5 of the spout 4. Note that, the squeeze bottle according to the present embodiment may include a gripping portion 13 at a lower part of the housing portion 3 similar to the squeeze bottle produced in Test Example 4.

FIG. 4(*c*) is a view schematically illustrating a cross section (the cross section along the direction perpendicular to the direction in which the liquid composition is dropped or poured out) of the housing portion of the squeeze bottle produced in Test Example 4. As illustrated in FIG. 4(*c*), the housing portion 3 has a two-layer structure including an outer layer 14 and an inner layer 15 in contact with a liquid composition (purified water) 16, and the inside thereof is filled with the liquid composition (purified water) 16.

The shape of the housing portion of each produced squeeze bottle was 12 mm in height, 9.5 mm in major axis (inner diameter), 8 mm in minor axis (inner diameter), 0.1 mm in inner layer thickness, and 0.3 mm in outer layer thickness. The cross section (the cross section along a direction perpendicular to a direction in which a liquid composition is dropped or poured out) of the housing portion of each produced squeeze bottle was an ellipse. The opening of each produced squeeze bottle was a circle, and the diameter thereof was 1.5 mm (inner diameter).

The compressive strength on the side surface (circumferential surface) of the housing portion of the squeeze bottle of each test example was calculated in the same manner as in Test Example 1 except that half distance of the distance between the maximum test force measurement site and the measurement stage (inner diameter of minor axis: 8 mm, thickness of inner layer: 0.1 mm, and thickness in outer layer: 0.3 mm) was 4.4 mm. The results are indicated in Table 5.

Test Example 5: Operability Evaluation (3)

In the same manner as in Test Example 4, two-layer squeeze bottles of the respective test examples indicated in Table 5 were produced.

Five adult male subjects grasped and twisted the lid of the squeeze bottle, and opened the opening by separating the lid and the container body. Next, the subject dropped a drop of purified water with which the squeeze bottle was filled from 10 cm above a plane on which a circle with a diameter of 24 mm was placed to the center point of the circle as a target. Regarding the operability, the questionnaire was answered by a VAS (Visual Analog Scale) method. The subject attempted to drop the number of drops indicated in the questionnaire. Specifically, regarding the three items of 1) it was possible to drop only one droplet to a target site (center point of a circle with a diameter of 24 mm), 2) it was possible to continuously drop two droplets to the target site (center point of a circle with a diameter of 24 mm), and 3) it was possible to deposit the droplets to a target point (the center point of a circle with a diameter of 24 mm) at the intended timing, assuming that "most felt" was 10 cm and "not felt at all" was 0 cm on a survey sheet on which a 10 cm straight line was written, the subject was shown the points on the straight line corresponding to each of the above items, and the distance (cm) from the 0 cm point was measured to obtain a VAS value. More specifically, in the evaluation of 1), if it most felt that the center point of the circle with a diameter of 24 mm and the center of the deposited droplet after dropping were overlapped with each other, the distance was 10 cm, or if it was not possible to drop on the circle with a diameter of 24 mm, or it was not possible to drop only one droplet (for example, it was not discharged in a droplet shape), the distance was 0 cm, and in the evaluation of 2), of the two continuously dropped droplets, regarding one droplet where the center point of the circle with a diameter of 24 mm and the center of the deposited droplet after dropping are further apart from each other, if it most felt that the center point of the circle with a diameter of 24 mm and the center of the deposited droplet after dropping were overlapped with each other, the distance was 10 cm, or if it was not possible to drop on the circle with a diameter of 24 mm, or it was not possible to continuously drop two droplets, the distance was 0 cm. The average of the VAS values of 5 subjects was taken as the VAS value of the test example. The results are indicated in Table 5. In addition, it can be evaluated that the squeeze bottle is excellent in the operability as the value which totaled the VAS value regarding each evaluation item is large.

TABLE 5

| | | TEST EXAMPLE 1-12 | TEST EXAMPLE 1-13 | TEST EXAMPLE 1-14 |
|---|---|---|---|---|
| INNER LAYER | CYCLIC OLEFIN COPOLYMER | 100 | 90 | 70 |
| | LINEAR LOW-DENSITY POLYETHYLENE | — | 10 | 30 |
| OUTER LAYER | LOW-DENSITY POLYETHYLENE | 100 | 100 | 100 |
| TEST EXAMPLE 4: COMPRESSIVE STRENGTH (N/mm) | | 57.8 | 44.8 | 39.3 |

TABLE 5-continued

|  |  | TEST EXAMPLE 1-12 | TEST EXAMPLE 1-13 | TEST EXAMPLE 1-14 |
|---|---|---|---|---|
| TEST EXAMPLE 5: VAS VALUE | IT WAS POSSIBLE TO DROP ONLY ONE DROPLET | 6.8 | 7.8 | 8.8 |
|  | IT WAS POSSIBLE TO CONTINUOUSLY DROP TWO DROPLETS | 6.8 | 7.8 | 8.8 |
|  | IT WAS POSSIBLE TO DEPOSIT DROPLETS TO TARGET POINT AT INTENDED TIMING | 6.6 | 7.6 | 8.6 |
| CONTENT OF CYCLIC OLEFINS IN CONTAINER BODY (% BY MASS) | | 50 | 22.5 | 17.5 |
| CONTENT OF POLYETHYLENES IN CONTAINER BODY (% BY MASS) | | 50 | 77.5 | 82.5 |
| CONTENT OF POLYETHYLENES WITH RESPECT TO 1 PART BY MASS OF CYCLIC OLEFINS, IN LAYER CONTAINING CYCLIC OLEFINS AND POLYETHYLENES (PART BY MASS) | | — | 0.1 | 0.43 |

It was confirmed that the compressive strength was low and the operability was improved in all cases of the squeeze bottles in Test Examples 1-13 and 1-14 with a resin containing a cyclic olefin copolymer and linear low-density polyethylene as an inner layer as compared with the squeeze bottle in Test Examples 1-12 with a resin containing a cyclic olefin copolymer but not containing linear low-density polyethylene as an inner layer.

Test Example 6: Operability Evaluation (4)

In the same manner as in Test Example 4, two-layer squeeze bottles having different opening areas in the respective test examples indicated in Tables 6 and 7 were produced.

Next, in the same manner as in Test Example 5, regarding the area of the opening, and the three items of 1) it was possible to drop only one droplet to a target site (center point of a circle with a diameter of 24 mm), 2) it was possible to continuously drop two droplets to the target site (center point of a circle with a diameter of 24 mm), and 3) it was possible to deposit the droplets to a target point (the center point of a circle with a diameter of 24 mm) at the intended timing, the VAS values in the respective test examples were calculated. The results are indicated in Tables 6 and 7.

TABLE 6

|  |  | TEST EXAMPLE 2-15 | TEST EXAMPLE 2-16 | TEST EXAMPLE 2-17 | TEST EXAMPLE 2-18 |
|---|---|---|---|---|---|
| INNER LAYER | CYCLIC OLEFIN COPOLYMER | 90 | 90 | 90 | 90 |
|  | LINEAR LOW-DENSITY POLYETHYLENE | 10 | 10 | 10 | 10 |
| OUTER LAYER | LOW-DENSITY POLYETHYLENE | 100 | 100 | 100 | 100 |
| AREA OF OPENING ($mm^2$) | | 0.196 | 1.767 | 4.09 | 12.57 |
| VAS VALUE | IT WAS POSSIBLE TO DROP ONLY ONE DROPLET | 0.8 | 7.8 | 6.8 | 5.4 |
|  | IT WAS POSSIBLE TO CONTINUOUSLY DROP TWO DROPLETS | 0.1 | 7.8 | 6.6 | 5.4 |
|  | IT WAS POSSIBLE TO DEPOSIT DROPLETS TO TARGET POINT AT INTENDED TIMING | 0.4 | 7.8 | 6.8 | 5.2 |

TABLE 7

|  |  | TEST EXAMPLE 2-19 | TEST EXAMPLE 2-20 | TEST EXAMPLE 2-21 | TEST EXAMPLE 2-22 |
|---|---|---|---|---|---|
| INNER LAYER | CYCLIC OLEFIN COPOLYMER | 70 | 70 | 70 | 70 |
|  | LINEAR LOW-DENSITY POLYETHYLENE | 30 | 30 | 30 | 30 |

TABLE 7-continued

|  |  | TEST EXAMPLE 2-19 | TEST EXAMPLE 2-20 | TEST EXAMPLE 2-21 | TEST EXAMPLE 2-22 |
|---|---|---|---|---|---|
| OUTER LAYER | LOW-DENSITY POLYETHYLENE | 100 | 100 | 100 | 100 |
| AREA OF OPENING (mm$^2$) | | 0.196 | 1.767 | 4.09 | 12.57 |
| VAS VALUE | IT WAS POSSIBLE TO DROP ONLY ONE DROPLET | 1.6 | 9.2 | 8.0 | 6.4 |
|  | IT WAS POSSIBLE TO CONTINUOUSLY DROP TWO DROPLETS | 1.2 | 9.2 | 8.0 | 6.6 |
|  | IT WAS POSSIBLE TO DEPOSIT DROPLETS TO TARGET POINT AT INTENDED TIMING | 0.8 | 9.2 | 8.2 | 6.4 |

Test Example 7: Operability Evaluation (5)

In the same manner as in Test Example 4, two-layer squeeze bottles of the respective test examples indicated in Table 8 were produced. The shape of the produced housing portion of each squeeze bottle was 12 mm in height, 9.5 mm in major axis (inner diameter), 8 mm minor axis (inner diameter), 0.1 mm in thickness of inner layer, and 0.3 mm in thickness of outer layer for Test Examples 3-1 to 3-3, and it was 12 mm in height, 9.5 mm (inner diameter) in major axis, 8 mm (inner diameter) in minor axis (inner diameter), 0.2 mm in thickness of inner layer, and 0.2 mm in thickness of outer layer for Test Examples 3-4 and 3-5. In addition the cross section (the cross section along a direction perpendicular to a direction in which a liquid composition is dropped or poured out) of the housing portion of each produced squeeze bottle was an ellipse. Further, the opening of each squeeze bottle produced was a circle, and the diameter thereof was 1.5 mm (inner diameter).

Regarding items of 1) ease of opening the opening when the lid of the squeeze bottle is gripped and twisted to separate the lid from the housing portion, and 2) smoothness when touching the opening after opening with a finger, the five subjects answered a questionnaire by a VAS (Visual Analog Scale) method. Specifically, regarding the above two items, assuming that "most felt" was 10 cm and "not felt at all" was 0 cm on a survey sheet on which a 10 cm straight line was written, the subject was shown the points on the straight line corresponding to each of the above items, and the distance (cm) from the 0 cm point was measured to obtain a VAS value. The average of the VAS values of 5 subjects was taken as the VAS value of the test example. The results are indicated in Table 8. In addition, it can be evaluated that the squeeze bottle is excellent in the operability as the value which totaled the VAS value regarding each evaluation item is large.

TABLE 8

|  |  | TEST EXAMPLE 3-1 | TEST EXAMPLE 3-2 | TEST EXAMPLE 3-3 | TEST EXAMPLE 3-4 | TEST EXAMPLE 3-5 |
|---|---|---|---|---|---|---|
| INNER LAYER | CYCLIC OLEFIN COPOLYMER | 100 | 90 | 70 | 90 | 70 |
|  | LINEAR LOW-DENSITY POLYETHYLENE | — | 10 | 30 | 10 | 30 |
| OUTER LAYER | LOW-DENSITY POLYETHYLENE | 100 | 100 | 100 | 100 | 100 |
| VAS VALUE | EASE OF OPENING | 7.2 | 8.2 | 9.4 | 7.8 | 8.2 |
|  | SMOOTHNESS OF OPENING | 7.4 | 8.6 | 9.0 | 8.0 | 8.4 |
| CONTENT OF CYCLIC OLEFINS IN CONTAINER BODY (% BY MASS) | | 50 | 22.5 | 17.5 | 45.0 | 35.0 |
| CONTENT OF POLYETHYLENES IN CONTAINER BODY (% BY MASS) | | 50 | 77.5 | 82.5 | 55.0 | 65.0 |
| CONTENT OF POLYETHYLENES WITH RESPECT TO 1 PART BY MASS OF CYCLIC OLEFINS, IN LAYER CONTAINING CYCLIC OLEFINS AND POLYETHYLENES (PART BY MASS) | | — | 0.1 | 0.43 | 0.1 | 0.43 |

It was confirmed that the operability was improved in all cases of the squeeze bottles in Test Examples 3-2 to 3-5 with a resin containing a cyclic olefin copolymer and linear low-density polyethylene as an inner layer as compared with the squeeze bottle in Test Examples 3-1 with a resin containing a cyclic olefin copolymer but not containing linear low-density polyethylene as an inner layer. One (subject C) of the subjects felt little resistance (VAS value was 9.5) when the lid and the housing portion of the squeeze bottle in Test Example 3-3 were separated from each other. When the subject C touched the opening of the squeeze bottle of Test Example 3-2 with his/her finger, almost no unevenness was felt (VAS value was 9.0). When the subject C touched the opening of the squeeze bottle of Test Example 3-1 with his/her finger, the unevenness was felt and visually observed (VAS value is 7.0).

Further, when the maximum value of the light transmittance of the housing portion was measured, all of the light transmittance were 50% or more, for example, it was 82% in Test Example 3-2, 88% in Test Example 3-3, 78% in Test Example 3-4, and 80% in Test Example 3-5. The maximum value of the light transmittance is calculated from the light transmittance obtained by measuring the light transmittance every 10 nm between the wavelengths of 400 to 700 nm using a microplate reader (SH-9000, produced by Corona Electric Co., Ltd.).

Test Example 8: Operability Evaluation (6)

In the same manner as in Test Example 4, two-layer squeeze bottles of the respective test examples indicated in Table 8 were produced. Five adult male subjects grasped and twisted the lid of the squeeze bottle of each of the above test examples, separated the lid from the container body to open the opening, and then discharged the purified water with which the squeeze bottle was filled from the opening to make the housing portion of the squeeze bottle empty. Next, each subject grasped two sites of a right side surface (right circumferential surface) central part and a left side surface (left circumferential surface) central part of the housing portion in the direction of the minor axis of the cross section with two fingertips, and pushed the two sites toward the center of the container until the distance between the two sites reached 4 mm, and released the two fingers from the housing portion after one second had elapsed after completion of the pushing. Based on the time when the fingers were released, by visually observing, each of 1) the time when a part where a recess was generated in the housing portion by the pushing-in started to return to the original shape and 2) the time until it completely returned to the original shape was measured. Each subject conducted the test for three squeeze bottles, and calculated the average of each the measured 1) and 2) times. A score was assigned according to the evaluation criteria in Table 9, and the total of the scores of 1) and 2) was calculated. The results of five subjects were averaged to determine the elasticity of the squeeze bottle. The results are indicated in Table 10. In addition, it can be evaluated that the larger the score, the better the elasticity, the easier it is for the user to control the operation of repeatedly discharging the liquid composition, and the more excellent operability the squeeze bottle has.

TABLE 9

| SCORE | TIME TO START RETURNING TO SHAPE BEFORE TEST | TIME UNTIL COMPLETELY RETURNED TO SHAPE BEFORE TEST |
|---|---|---|
| 5 POINTS | SHORTER THAN 1 SECOND | SHORTER THAN 1 SECOND |
| 4 POINTS | 1 SECOND OR LONGER AND SHORTER THAN 2 SECONDS | 1 SECOND OR LONGER AND SHORTER THAN 2 SECONDS |
| 3 POINTS | 2 SECONDS OR LONGER AND SHORTER THAN 3 SECONDS | 2 SECONDS OR LONGER AND SHORTER THAN 3 SECONDS |
| 2 POINTS | 3 SECONDS OR LONGER AND SHORTER THAN 4 SECONDS | 3 SECONDS OR LONGER AND SHORTER THAN 4 SECONDS |
| 1 POINT | 4 SECONDS OR LONGER AND SHORTER THAN 5 SECONDS | 4 SECONDS OR LONGER AND SHORTER THAN 5 SECONDS |
| 0 POINTS | 5 SECONDS OR LONGER | 5 SECONDS OR LONGER |

TABLE 10

| | TEST EXAMPLE 3-1 | TEST EXAMPLE 3-2 | TEST EXAMPLE 3-3 | TEST EXAMPLE 3-4 | TEST EXAMPLE 3-5 |
|---|---|---|---|---|---|
| LEVEL OF ELASTICITY | 3.4 | 8.2 | 9.2 | 6.4 | 7.6 |

REFERENCE SIGNS LIST

1 Squeeze bottle
2 Container body
3 Housing portion
3a Side surface (circumferential surface) of housing portion
3b Bottom surface of housing portion
4 Spout
5 Opening
6 Lid
10 Plane on which container body of squeeze bottle is placed when measuring maximum test force
11 Measuring probe
12 Maximum test force measurement site
13 Gripping portion
14 Inner layer
15 Outer layer
16 Liquid composition (purified water)

The invention claimed is:

1. A squeeze bottle integrally comprising:
   a container body including a housing portion for housing a liquid composition and a spout connected to the housing portion; and
   a lid joined to the container body so as to seal an opening of the spout,
   wherein the container body contains a resin containing cyclic olefins and polyethylenes, a total content of the cyclic olefins in a resin layer containing the cyclic olefins and the polyethylenes in contact with the liquid composition is 55% to 99% by mass based on a total amount of the resin containing the cyclic olefins and the polyethylenes.

2. The squeeze bottle according to claim 1, wherein an area of the opening of the spout is 0.15 to 20.0 $mm^2$.

3. The squeeze bottle according to claim 1, wherein a compressive strength on a side surface of the housing portion is 20 to 250 N/mm.

4. The squeeze bottle according to claim 1, wherein a maximum value of light transmittance in a visible light region of a wavelength of 400 to 700 nm of the container body is 50% or more.

5. The squeeze bottle according to claim 1, wherein the container body includes two or more layers of an inner layer and an outer layer, and the inner layer in contact with the liquid composition contains a resin containing cyclic olefins and polyethylenes.

6. The squeeze bottle according to claim 1, wherein the polyethylenes are low-density polyethylene and/or linear low-density polyethylene.

7. The squeeze bottle according to claim 1, wherein the liquid composition is an ophthalmic composition.

8. The squeeze bottle according to claim 1, wherein the total content of the cyclic olefins in a resin layer containing the cyclic olefins and the polyethylenes in contact with the liquid composition is 70% to 99% by mass based on a total amount of the resin containing the cyclic olefins and the polyethylenes.

* * * * *